(12) United States Patent
Freer

(10) Patent No.: US 12,467,513 B2
(45) Date of Patent: Nov. 11, 2025

(54) METHOD AND APPARATUS FOR ACTIVELY DAMPING VIBRATIONS IN A HYBRID-ELECTRIC AIRCRAFT PROPULSION SYSTEM

(71) Applicant: Pratt & Whitney Canada Corp., Longueuil (CA)

(72) Inventor: Richard Freer, St-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 146 days.

(21) Appl. No.: 18/238,250

(22) Filed: Aug. 25, 2023

(65) Prior Publication Data

US 2025/0067318 A1    Feb. 27, 2025

(51) Int. Cl.

| F16F 15/00 | (2006.01) |
|---|---|
| B64D 27/02 | (2006.01) |
| B64D 27/24 | (2024.01) |
| B64D 31/00 | (2024.01) |
| H02P 23/14 | (2006.01) |

(52) U.S. Cl.
CPC ............ *F16F 15/002* (2013.01); *B64D 27/24* (2013.01); *B64D 31/00* (2013.01); *H02P 23/14* (2013.01); *B64D 27/026* (2024.01)

(58) Field of Classification Search
CPC ....... F16F 15/002; B64D 27/24; B64D 31/00; B64D 27/026; B64D 31/18; B64D 35/025; B64D 27/33; H02P 23/14; B64C 11/008; B64C 27/001

USPC .................................................. 318/114, 445
See application file for complete search history.

(56) References Cited

U.S. PATENT DOCUMENTS

| 9,444,391 B2 * | 9/2016 | Le Peuvedic ......... H02J 7/1438 |
| 10,547,258 B2 * | 1/2020 | Ciciriello ................ F16C 17/02 |
| 11,300,059 B2 | 4/2022 | Bacic |
| 11,381,190 B2 * | 7/2022 | Kambrath ............... H02P 23/04 |
| 2016/0159340 A1 | 6/2016 | Chung |
| 2016/0218650 A1 | 7/2016 | Gajanayake |

(Continued)

FOREIGN PATENT DOCUMENTS

| CN | 104329220 B | 4/2017 |
| EP | 4187123 A1 | 5/2023 |

OTHER PUBLICATIONS

EP Search Report for EP Patent Application No. 24196311.5 dated Jan. 28, 2025.

*Primary Examiner* — David Luo
(74) *Attorney, Agent, or Firm* — Getz Balich LLC

(57) ABSTRACT

A method of and system for damping vibrations in a hybrid-electric propulsion system configured to drive a propulsor is provided. The hybrid-electric propulsion system includes a thermal engine, an electric motor, and an inverter. The method includes: a) controlling the thermal engine and the electric motor to operate at a target propulsion parameter, wherein the inverter is used in the controlling of the electric motor; b) determining a presence of a vibrational response within the hybrid-electric propulsion system; c) producing a vibration compensation signal configured to damp the vibrational response within the hybrid-electric propulsion system; and d) controlling the electric motor to damp the vibrational response using the vibration compensation signal.

18 Claims, 4 Drawing Sheets

(56) References Cited

U.S. PATENT DOCUMENTS

2019/0131902 A1     5/2019   Ciciriello
2023/0406523 A1    12/2023   Chen

\* cited by examiner

METHOD AND APPARATUS FOR ACTIVELY DAMPING VIBRATIONS IN A HYBRID-ELECTRIC AIRCRAFT PROPULSION SYSTEM

BACKGROUND OF THE INVENTION

1. Technical Field

The present disclosure relates to methods and apparatus for damping vibration in a hybrid-electric propulsion system.

2. Background Information

Resonance phenomena, which may cause vibrations of the drive train of a machine, such as a helicopter, may be engendered by the coupling of the natural modes of the drive train to those of the fuselage through the variation of the propulsor speed and the yawing motion of the fuselage. The vibrations may in turn render the overall machine unstable or difficult to control. It is therefore desirable to damp such a resonance of the drive train. In addition to resonance conditions, forced vibrations that are caused, for example, by the passage of rotor blades and the vibratory flexing of aircraft structure can result in undesirable vibrations, noise and structural fatigue in the drivetrain, engine and/or the aircraft structure. It is therefore desirable to damp such forced vibrations.

Various methods may be used for increasing the damping of the propulsor resonance and forced vibrations. Resonance damping may for instance result from the aerodynamic drag on the rotor blades, gear reductions, and inherent losses in the system. However, such damping may not be sufficient and additional damping may be desirable. For this purpose, control systems, which increase the resonance damping, may be used. However, such systems are typically complex and require high computational power.

It is known to control a thermal engine for purposes of damping propulsor resonance. Thermal engines, however, typically do not respond quickly to input and therefore there is inherently a lag in response and limitations in bandwidth that negatively affect the ability of thermal engine to response to resonant conditions and/or vibratory behavior in general.

There is therefore a need for an improved system and method for damping a resonant mode vibratory condition of an aircraft propulsion system.

SUMMARY

According to an aspect of the present disclosure, a method of damping vibrations in a hybrid-electric propulsion system configured to drive a propulsor is provided. The hybrid-electric propulsion system includes a thermal engine, an electric motor, and an inverter. The method includes: a) controlling the thermal engine and the electric motor to operate at a target propulsion parameter, wherein the inverter is used in the controlling of the electric motor; b) determining a presence of a vibrational response within the hybrid-electric propulsion system; c) producing a vibration compensation signal configured to damp the vibrational response within the hybrid-electric propulsion system; and d) controlling the electric motor to damp the vibrational response using the vibrational compensation signal.

In any of the aspects or embodiments described above and herein, the determination of the presence of the vibrational response within the system may be based on variations in a propulsion parameter of the electric motor.

In any of the aspects or embodiments described above and herein, the propulsion parameter of the electric motor may be an amount of torque produced by the electric motor.

In any of the aspects or embodiments described above and herein, the method may further include using the inverter to produce a torque signal representative of the amount of torque produced by the electric motor.

In any of the aspects or embodiments described above and herein, the torque signal may include a spectrum of frequencies, the spectrum including a base operating component and a vibratory component.

In any of the aspects or embodiments described above and herein, the method may further include separating the vibratory component of the torque signal from the spectrum of frequencies.

In any of the aspects or embodiments described above and herein, the step of producing the vibration compensation signal configured to damp the vibrational response within the hybrid-electric propulsion system may include producing the vibration compensation signal based on the vibratory component of the torque signal.

In any of the aspects or embodiments described above and herein, the step of controlling the electric motor to damp the vibrational response using the vibrational compensation signal may include modifying a torque target signal using the vibration compensation signal.

In any of the aspects or embodiments described above and herein, the modification of the torque target signal using the vibration compensation signal may include superimposing the vibration compensation signal onto the torque target signal.

In any of the aspects or embodiments described above and herein, steps (b), (c), and (d) may be performed in a control loop until the vibrational response is below a predetermined threshold.

According to an aspect of the present disclosure, a method of damping vibrations in a hybrid-electric propulsion system configured to drive a propulsor is provided. The hybrid-electric propulsion system includes a thermal engine, an electric motor, and an inverter. The method includes: determining a presence of a vibrational response within the hybrid-electric propulsion system based on variations of a propulsion parameter of the electric motor, the variations determined within the inverter; producing a vibration compensation signal configured to damp the vibrational response within the hybrid-electric propulsion system; modifying the propulsion parameter with the vibration compensation signal to produce a modified propulsion parameter; and using the inverter to control the electric motor to damp the vibrational response using the modified propulsion parameter.

According to an aspect of the present disclosure, a hybrid-electric propulsion system for an aircraft is provided that includes a propulsor, a thermal engine, an electrical power motive system, and a system controller. The thermal engine is configured to provide motive power to the propulsor. The electrical power motive system is configured to provide motive power to the propulsor. The electrical power motive system includes an electrical distribution bus in communication with an electric motor and an inverter. The system controller is in communication with the thermal engine, the electrical power motive system, and a non-transitory memory storing instructions. The instructions when executed cause the system controller to: control the thermal engine and the electric motor to operate at a target propulsion parameter, wherein the control of the electric motor includes the system controller cooperating with the inverter to control the thermal engine; determine a presence of a vibrational response within the hybrid-electric propulsion system; produce a vibration compensation signal configured to damp the vibrational response within the hybrid-electric propulsion system; and control the electric motor to damp the vibrational response using the vibrational compensation signal.

In any of the aspects or embodiments described above and herein, the inverter may be independent of and in communication with the system controller, or the inverter is at least partially integrated within the system controller.

In any of the aspects or embodiments described above and herein, the determination of the presence of the vibrational response within the system further may be based on variations of a propulsion parameter of the electric motor.

In any of the aspects or embodiments described above and herein, the amount of torque produced by the electric motor may be determined by the inverter.

In any of the aspects or embodiments described above and herein, the inverter may be configured to produce a torque signal representative of the amount of torque produced by the electric motor, and the torque signal includes a spectrum of frequencies.

In any of the aspects or embodiments described above and herein, the vibration compensation signal may be configured to damp the vibratory component.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
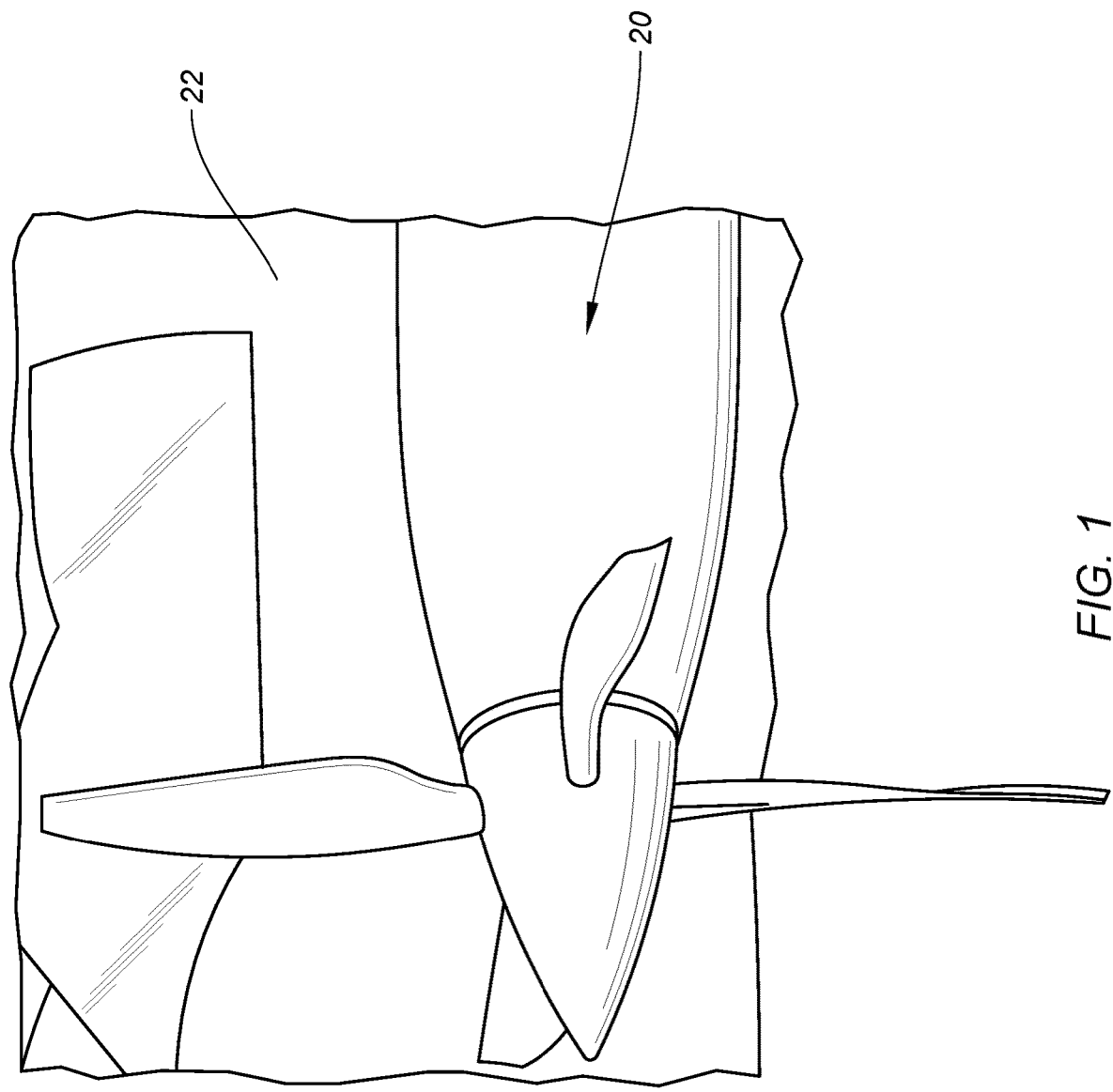
FIG. 1 is a diagrammatic partial view of an aircraft with a present disclosure hybrid-electric propulsion system.

FIG. 1 illustrates a hybrid-electric propulsion system ("HEP system 20") disposed on an aircraft 22. The aircraft 22 may be a fixed-wing aircraft, a rotary-wing aircraft (e.g., a helicopter), a tilt-rotor aircraft, a tilt-wing aircraft, or any other aerial vehicle. The aircraft 22 may be a manned aerial vehicle or an unmanned aerial vehicle (UAV, e.g., a drone). As will be detailed herein, present disclosure HEP systems 20 include a thermal engine and an electrical power motive system, and the present disclosure system can be configured in a variety of different embodiments. The thermal engine may be a gas turbine engine, a rotary engine, a piston engine, a rotating detonation engine, or another type of combustion engine. In those embodiments wherein the thermal engine is a gas turbine engine, the gas turbine engine may take the form of a turboprop engine, a turboshaft engine, a turbojet engine, a propfan engine, or an open rotor engine, or the like. The propulsor may be any type of device (e.g., propellers, fan blades, rotor blades for a helicopter, a tilt-rotor aircraft, or a tilt-wing aircraft) that can be rotated to provide motive thrust. To facilitate an understanding of the present disclosure, exemplary embodiments of a present disclosure HEP system 20 are diagrammatically shown in FIGS. 2 and 3. The present disclosure is not limited to these examples.

Figure 2:
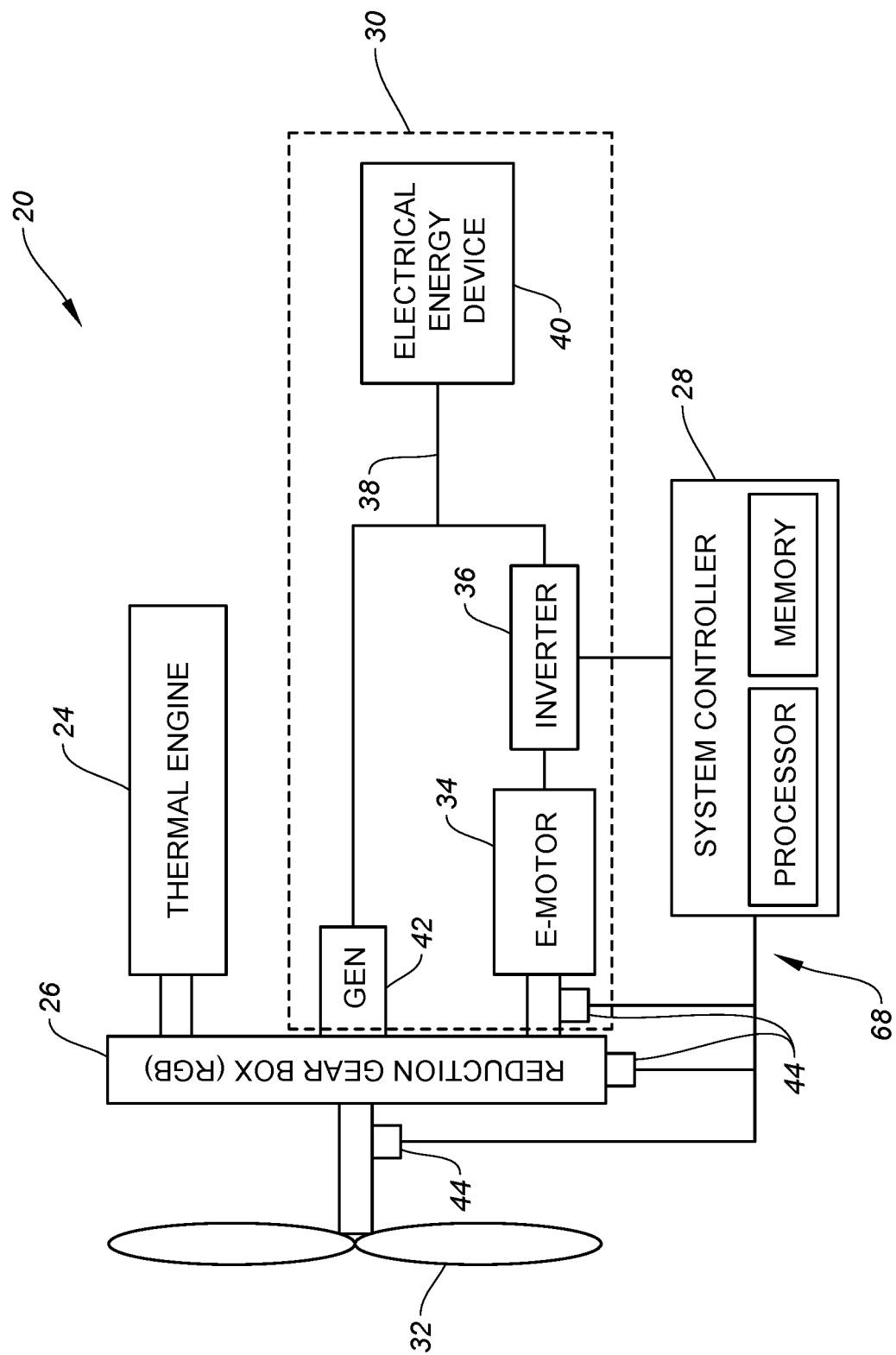
FIG. 2 is a diagrammatic view of a present disclosure hybrid-electric propulsion system embodiment.

FIG. 2 diagrammatically illustrates an HEP system 20 embodiment that includes a thermal engine 24, a reduction gear box 26, a system controller 28, an electrical power motive system 30, and a propulsor 32. The electrical power motive system 30 includes an electric motor 34, an inverter 36, an electrical distribution bus 38, and an electrical energy device 40. The electrical power motive system 30 may include an electric generator 42, but does not require an electric generator 42. The electrical distribution bus 38 is configured to provide electrical communication between the electric motor 34, the inverter 36, the electrical energy device 40, and the electric generator 42 if included. The thermal engine 24 and the electric motor 34 are in communication with the reduction gear box 26 and are arranged in a parallel configuration. This HEP system 20 embodiment is configured so that either the thermal engine 26 or the electric motor 34, or both, provide motive force to the reduction gear box 26 and the reduction gear box 26, in turn, provides motive power to the propulsor 32. The HEP system 20 is also configured so that the electric motor 34 can apply a load on the reduction gear box 26 as will be detailed herein. The propulsor 32 is shown in FIG. 2 as a plurality of propellers. The embodiment shown in FIG. 2 includes a plurality of sensors 44 (e.g., rotational speed sensors, vibration sensors, and the like), but sensors 44 are not required for all embodiments of the present disclosure.

Figure 3:
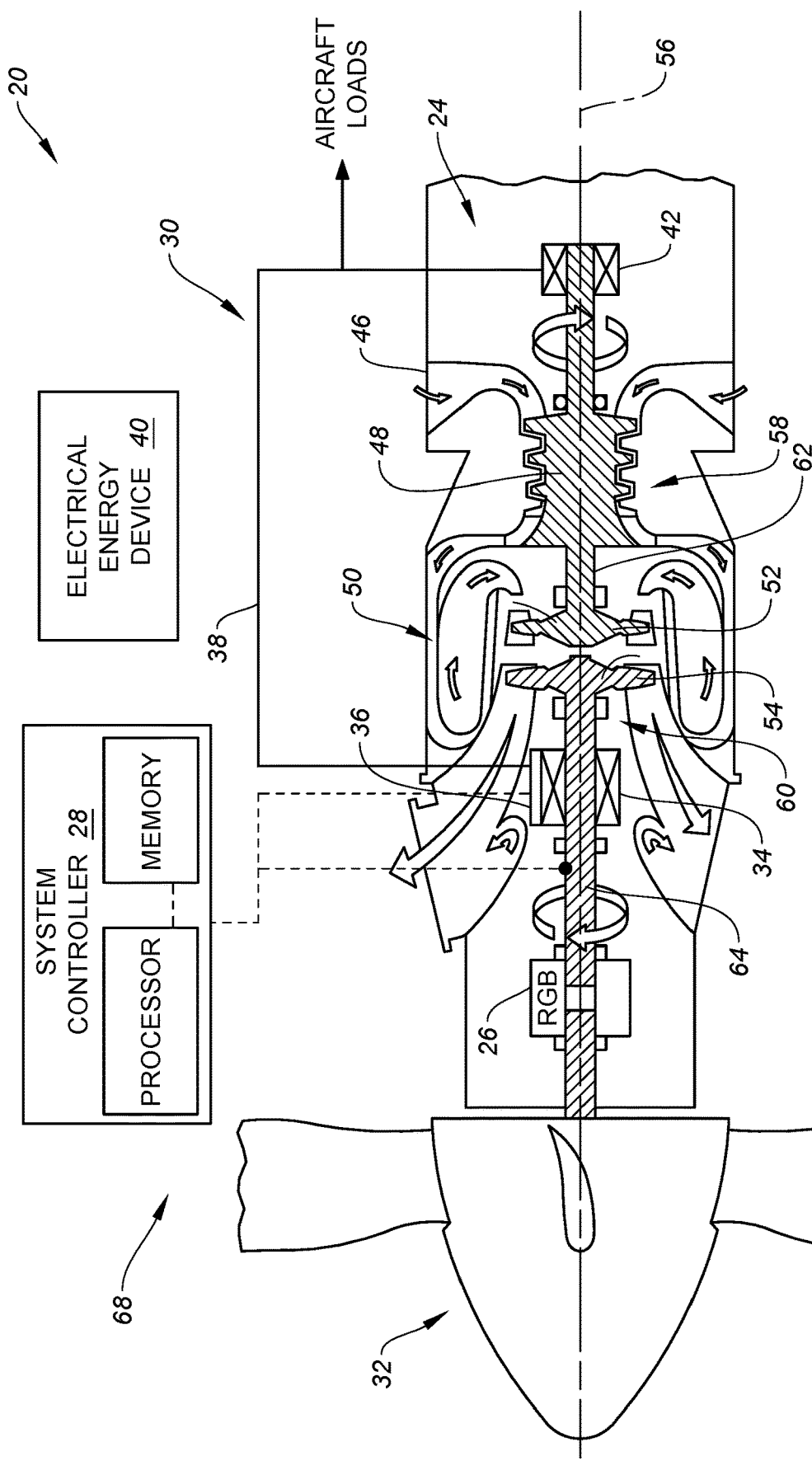
FIG. 3 is a diagrammatic view of a present disclosure hybrid-electric propulsion system embodiment.

FIG. 3 diagrammatically illustrates an HEP system 20 embodiment in a sectional side view that includes a thermal engine 24, a reduction gear box 26, a propulsor 32, a system controller 28, and an electrical power motive system 30. The thermal engine 24 is a turboprop gas turbine engine. The propulsor 32 includes a plurality of propeller blades.

The gas turbine engine shown in FIG. 3 includes an air inlet 46, a compressor 48, a combustor 50, a high-pressure turbine 52, and a power turbine 54. The air inlet 46, the compressor 48, the combustor 50, the high-pressure turbine 52, and the power turbine 54 are arranged along an axial centerline 56 (e.g., a rotational axis) of the gas turbine engine. The gas turbine engine may be described as having a first rotational assembly 58 and a second rotational assembly 60. The first rotational assembly 58 and the second rotational assembly 60 are mounted for rotation about the axial centerline 56. The gas turbine engine has a "free turbine" configuration in which power for aircraft propulsion is extracted by the second rotational assembly 60 downstream of (e.g., from the exhaust of) the first rotational assembly 58. The present disclosure, however, is not limited to a free turbine configuration.

The terms "forward" and "aft" are used herein to indicate position along the axial centerline 56; referring to the turbine engine shown in FIG. 3, the power turbine 54 is disposed forward of the high-pressure turbine 52, and the high-pressure turbine 52 is disposed aft of the power turbine 54. The term "upstream" and "downstream" are used to indicate position within the gas path of the turbine engine; e.g., the high-pressure turbine 52 is upstream of the power turbine 54 and the power turbine 54 is downstream of the high-pressure turbine 52 because core gas exits the high-pressure turbine 52 and enters the power turbine 54. The term "radial" refers to a direction that is perpendicular to the axial centerline 56 and may be used herein to indicate position relative to the axial centerline 56; e.g., a first component positioned "radially inward" of a second component is disposed closer to the axial centerline 56 than the second component, and conversely the second component is disposed "radially outward" of the first component.

Referring again to FIG. 3, the first rotational assembly 58 includes a first shaft 62 connecting the compressor 48 to the high-pressure turbine 52. The second rotational assembly 60 includes a second shaft 64 connected to the power turbine 54. The second shaft 64 may be directly or indirectly connected to the propulsor 32. For example, the second shaft 64 may be configured to rotatably drive the propulsor 32 via the reduction gear box 26. The RGB 26 may be configured to drive the propulsor 32 at a reduced rotational speed relative to the rotational speed of the second shaft 64.

During operation of the gas turbine engine shown in FIG. 3, ambient air enters the gas turbine engine through the air inlet 46 and is directed into the compressor 48. The ambient air is compressed within the compressor 48 and is directed into the combustor 50. Fuel is injected into the combustion and is mixed with the compressed air to provide a fuel-air mixture. This fuel-air mixture is ignited, and combustion products thereof flow through and sequentially cause the high pressure turbine 52 rotor and the power turbine 54 to rotate. The rotation of the high pressure turbine 52 and the power turbine 54 respectively drive rotation of the first rotational assembly 58 and the second rotational assembly 60. Rotation of the second rotational assembly 60 further drives rotation of the propulsor 32 to provide propulsion (e.g., thrust) for the aircraft 22. Combustion exhaust gas flowing past the power turbine 54 is directed out of the gas turbine engine (e.g., through an exhaust).

The electrical power motive system 30 in the embodiment of FIG. 3 includes an electric motor 34, an inverter 36, an electrical distribution bus 38, and an electrical energy device 40; e.g., a battery. In some embodiments, the electrical power motive system 30 may further include a generator 42. The electrical distribution bus 38 is configured to provide electrical communication between the electric motor 34, the inverter 36, the electrical energy device 40, and the electric generator 42 if included. The electrical power motive system 30 may include additional electrical components such as, but not limited to, breakers, contactors, transformers, alternating current (AC) to direct current (DC) conversion components, DC to AC conversation components, and the like.

In the present disclosure (including the embodiments diagrammatically shown in FIGS. 2 and 3), the electrical energy device 40 may be configured as an electrical power storage device that can be charged and discharged, or may be configured solely as a source of electrical power. A non-limiting example of an electrical energy device 40 that can be charged and discharged is a battery. A battery may be a single battery, or a plurality of battery modules (e.g., battery packs), battery cells, and/or the like electrically connected together in series and/or parallel as necessary to configure the battery with the desired electrical characteristics (e.g., voltage output, current output, storage capacity, etc.). The present disclosure is not limited to any particular battery configuration. A non-limiting example of an electrical energy device 40 configured solely as a source of electrical power is a fuel cell.

In the present disclosure (including the embodiments diagrammatically shown in FIGS. 2 and 3), the electric motor 34 may be controlled to operate in an electric motor mode wherein it produces a rotational force. The electric motor 34 may also be controlled to operate in an electrical generator mode where it is driven and thereby produces a rotational load. In the system embodiment shown in FIG. 3, for example, the electric motor 34 may be configured to apply a rotational force to the second rotational assembly 60 to facilitate rotation of the propulsor 32 (i.e., electric motor mode) or may apply a rotational load on to the second shaft 64; e.g., i.e., in generator mode.

In the present disclosure (including the embodiments diagrammatically shown in FIGS. 2 and 3), the propulsor 32 may include a plurality of rotor blades (e.g., propeller blades, helicopter rotor blades, or a tilt-engine rotor blades, or the like). Rotor blades may be utilized in fixed-pitch rotor blade configuration or a variable-pitch rotor blade configuration. In a fixed-pitch rotor blade configuration the amount of thrust produced by the rotor blades is a function of the rotation speed of the rotor blades. In a variable-pitch rotor blade configuration, the pitch of the rotor blades can be selectively varied to produce a change in the amount of thrust produced by the rotor blades without changing the rotational speed of the rotor blades.

As will be detailed herein, the present disclosure may include an inverter 36 that is independent of and in signal communication with the system controller 28, or the inverter 36 may be partially or fully integral with the system controller 28 (or other controller). The inverter 36 may be configured to control (e.g., regulate) the electrical power (e.g., AC voltage and/or frequency) supplied to the electric motor 34 from the electrical distribution bus 38. The inverter 36 may be configured to measure or otherwise determine a rotation speed of and/or a torque produced by the electric motor 34. By controlling the electrical power supplied to the electric motor 34, the inverter 36 may control the electric motor 34 to operate at a controlled rotation speed and/or torque. For example, the inverter 36 may control the electric motor 34 to apply a positive torque, a negative torque (e.g., the electric motor 34 operating as a generator and applying a rotational load), or no torque to a system component. The inverter 36 may include one or more sensors (or control logic) configured to measure a rotation speed and/or torque of the electric motor 34. The inverter 36 may include an electronic control system that includes a processor connected in signal communication with a non-transitory memory storing instructions, which instructions when executed by the processor, cause the inverter 36 and/or its processor to control a rotation speed and/or torque of the electric motor 34. The inverter 36 is not limited to any particular configuration or electronic control architecture.

The system controller 28 may include one or more processors connected in signal communication with a memory device. The processor may include any type of computing device, computational circuit, processor(s), CPU, computer, or the like capable of executing a series of instructions that are stored in the memory. Instructions can be directly executable or can be used to develop executable instructions. For example, instructions can be realized as executable or non-executable machine code or as instructions in a high-level language that can be compiled to produce executable or non-executable machine code. In addition, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the thermal engine 24 and/or the electrical power motive system 30 to accomplish the same algorithmically and/or by coordination of the thermal engine 24 and/or the electrical power motive system 30 components. The memory may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the system controller 28. The system controller 28 may include, or may be in communication with, an input device that enables a user to enter data and/or instructions, and may include, or be in communication with, an output device configured, for example to display information (e.g., a visual display or a printer), or to transfer data, etc. Communications between the system controller 28 and other electrical and/or electronic components (e.g., controllers, sensors, etc.) may be via a hardwire connection or via a wireless connection. A person of skill in the art will recognize that portions of the system controller 28 may assume various forms (e.g., digital signal processor, analog device, etc.) capable of performing the functions described herein.

The system controller 28 may be independent of and in signal communication with the inverter 36, or the inverter 36 may be partially or fully integral with the system controller 28. The functions of the system controller 28 described herein may be performed by the system controller 28 itself, or may be performed in combination with or cooperatively with one or more other controllers (e.g., the inverter 36, an engine controller, an electric motor controller, an avionics system such as a flight control computer, or any combination thereof). The system controller 28 may include or functionally be a part of an electronic engine controller (EEC) for the thermal engine 24. The EEC may control operating parameters of the thermal engine 24 (which parameters may depend on the type of thermal engine 24). In some embodiments, the EEC may be part of a full authority digital engine control (FADEC) system for the present disclosure HEP system 20. To facilitate the description herein and unless otherwise specifically noted, the functionality of the present disclosure is described herein as being performed by the system controller 28. The present disclosure is not, however, limited to being performed by a singular, independent system controller 28.

The present disclosure HEP system 20 may include one or more sensors (e.g., sensors 44 as shown in FIG. 2) in signal communication with the system controller 28. The one or more sensors may include a shaft rotation speed sensor, a shaft torque sensor, temperature sensors, pressure sensors, accelerometers, fuel flow sensors, propeller blade pitch sensors, and the like.

In those system embodiments that include a generator 42, the generator 42 may be configured to supply electrical power to the electrical power motive system 30. The generator 42 is in electrical communication with the electrical distribution bus 38 to supply electrical power to the system 20 and/or the aircraft 22.

The system controller 28 (e.g., via stored instructions, or control hardware, or any combination thereof) is configured to control the propulsor 32. A propulsion target parameter for control of the propulsor 32 may be provided to or determined by the system controller 28. For example, a propulsion target parameter may be provided to the system controller 28 by an aircraft pilot, or by one or more other control systems of the HEP system 20, or from an aspect of the aircraft 22, or any combination thereof. A propulsion target parameter may be determined, for example, to achieve or maintain a selected propulsor speed and/or to observe one or more HEP system 20 operational limits. The propulsion target parameter may include, but is not limited to, a target propulsor speed, a target total torque applied to the propulsor 32, and/or a target thermal engine 24 power (e.g., shaft horsepower (SUP) as a function of the propulsor rotation speed and the total torque). The propulsion target parameter may be a steady state or a transient parameter. For example, a value of the propulsion target parameter may change over a period of time to facilitate execution of a transient propulsion condition (e.g., acceleration, deceleration, takeoff, landing, low noise or high speed flight, etc.) for the propulsor 32. The system controller 28 may control the HEP system 20 to drive the propulsor 32 consistent with the propulsion target parameter. For example, the system controller 28 may control the HEP system 20 to drive the propulsor 32 at a target propulsor speed, a target total torque, or a target thermal engine 24 power.

The system controller 28 may be configured to identify a deviation of an actual propulsion parameter from the propulsion target parameter. Similar to the propulsion target parameter, the actual propulsion parameter may include, but is not limited to, an actual propulsor speed, an actual total torque applied to the propulsor 32, and/or an actual thermal engine power. The identification may include measuring and/or determining the actual propulsion parameter (e.g., using sensors and/or control logic, such as inverter 36 control logic) and comparing it to the propulsion target parameter. If any difference between the actual propulsion parameter and the propulsion target parameter is outside of a threshold value, then the difference between therebetween would be identified as a deviation.

The system controller 28 recognizes the relatively fast responsiveness (e.g., rapid torque control) of an electric motor 34 for controlling propulsor 32 operation, in comparison to the responsiveness of a thermal engine 24. The system controller 28 may be configured to control the electric motor 34 to facilitate maintaining the actual propulsion parameter at the propulsion target parameter. For example, the system controller 28 (and/or the inverter 36, or some combination thereof) may control the electric motor 34 to provide motive force or load to prevent, eliminate, control, and/or reduce a deviation of the actual propulsion parameter from the propulsion target parameter. The system controller 28 may control the thermal engine 24 and the electric motor 34 to cooperatively control rotation of the propulsor 32 to maintain the actual propulsion parameter at the propulsion target parameter or to reduce a deviation of the actual propulsion parameter from the propulsion target parameter. For example, the system controller 28 may identify a new target torque for the propulsor 32 based on the magnitude of the deviation of the propulsion parameter from the propulsion target parameter. The system controller 28 may execute a control loop for the target torque by continuously updating the target torque to reduce the deviation of the actual propulsion parameter from the propulsion target parameter. More specifically, the system controller 28 (e.g., via an independent or an integral inverter 36) may control the electric motor 34 to apply a positive torque or a negative torque to decrease or eliminate the deviation between the propulsion parameter from the propulsion target parameter. U.S. patent application Ser. No. 18/196,740, entitled "System and Method for Controlling a Propulsor for a Hybrid-Electric Aircraft Propulsion System", filed May 12, 2023, and commonly assigned with the present application, and which is hereby incorporated by reference in its entirety, describes a system and method for controlling a propulsor for an HEP system 20 that may be incorporated in part or in whole into the system controller 28.

The present disclosure HEP system 20 includes a resonance disturbance rejection controller (i.e., "RDR controller" 68) configured to identify and damp vibrational responses that may occur in the operation of the HEP system 20 and/or in the aircraft 22 powered by the HEP system 20. In some embodiments, the RDR controller 68 may be independent of, and in communication with, the system controller 28, or the RDR controller 68 may partially or fully integral with the system controller 28. In some embodiments, the RDR controller 68 may be independent of, and in communication with, the inverter 36, or the RDR controller 68 may be partially or fully integral with the inverter 36. The RDR controller 68 includes a means for determining the presence of an undesirable vibration in the HEP system 20, or in the aircraft 22, or both, or the RDR controller 68 may be in communication with the aforesaid means. The means for determining the presence of an undesirable vibration in the HEP system 20 may include an electric motor torque sensor (e.g., configured to detect steady state torque values and/or periodic variations thereof), or an electric motor rotational speed sensor (e.g., to identify steady state rotational speed values and/or periodic variations thereof), or any combination thereof. The aforesaid "sensors" may take the form of control logic that performs the aforesaid sensing. In some embodiments, the means for determining the presence of an undesirable vibration in the HEP system 20 may include a vibration sensor configured to directly sense vibrations.

Nonlimiting examples of electric motor 34 operating parameters include voltage, current, phase angle, or the like, or secondary operating parameters (e.g., estimated torque) determined from the aforesaid operating parameters. Each of the electric motor 34 operating parameters may include a plurality of frequency components that collectively provide that operating parameter with an overall frequency characteristic or spectrum. Within that overall frequency characteristic, the operating parameter may be described as having a base operating component that is representative of an average (or other similar statistical function) of that operating parameter, a noise component that is representative of external factors, and a vibratory component that is representative of parameter oscillations attributable to system vibrations. System vibrations may be produced by a resonance condition developed under HEP system 20 loading. The base operating component is typically predominant relative to the noise component; e.g., the noise component is substantially smaller in magnitude and/or distinguishable via frequency relative to the base operating component. In those instances wherein a vibratory component is present that can detrimentally affect the operation of the HEP system 20, the vibratory component is also typically predominant relative to the noise component; e.g., substantially smaller in magnitude and/or distinguishable via frequency relative to the base operating component. Hence, the overall frequency characteristic of the operating parameter may be considered as comprising the base operating component and the vibratory component. In some embodiments, signal processing techniques (e.g., filtering and the like) within the control logic can be used to separate the noise component from the base operating component and the vibratory component. Signal processing techniques (e.g., filtering and the like) within the control logic can also be used to separate the base operating component from the vibratory component. Signal processing techniques for separating the base operating component from the vibratory component (and for separating the noise component when included) are known and the present disclosure is not limited to any particular signal processing techniques.

The RDR controller 68 may be configured to receive and utilize the sensor input or the vibratory component of an electric motor 34 operating parameter identified via the control logic to produce a compensation signal that can be used to damp (i.e., attenuate or eliminate) any vibrational response that may occur in the operation of the HEP system 20 and/or the aircraft 22. For example, if the compensation signal is based on sensor input, the RDR controller 68 may be configured with instructions (e.g., look up tables, algorithmic instructions, or the like) that can be used to determine an appropriate compensation signal based on the sensor input. In similar fashion, if the RDR controller 68 is configured to determine a vibratory component of an electric motor 34 operating parameters identified via the control logic (e.g., as described above), the instructions (e.g., look up tables, algorithmic instructions, or the like) can be used to determine an appropriate compensation signal based on operating parameter vibratory component. The compensation signal may then be used to modify the operation of the electric motor 34 to damp (i.e., attenuate or eliminate) the undesirable vibrational response occurring in the operation of the HEP system 20.

As an example, the compensation signal may be configured in a form that can be superimposed on an operating parameter that controls the target torque applied to the propulsor 32 (e.g., via the electric motor 34). The superimposed signal may cause the target torque to be increased or decreased to damp (i.e., attenuate or eliminate) the identified undesirable vibrational response. The aforesaid superimposition of the compensation signal may be performed within the control logic of the inverter 36 (or the system controller 28). As another example, the compensation signal may be configured in a form that can be superimposed on rotating frame signals (that may be converted by a direct quantitative zero (DQZ) transformation, or a Clarke transformation, or an inverse Park transformation, or the like) to phase voltage signals that are used for controlling high speed switches (e.g., insulated gate bipolar transistors—IGBTs, metal oxide silicon field effect transistors—MOSFETS, silicon carbide (SiC) modules, gallium nitride (GaN) modules, and like).

Figure 4:
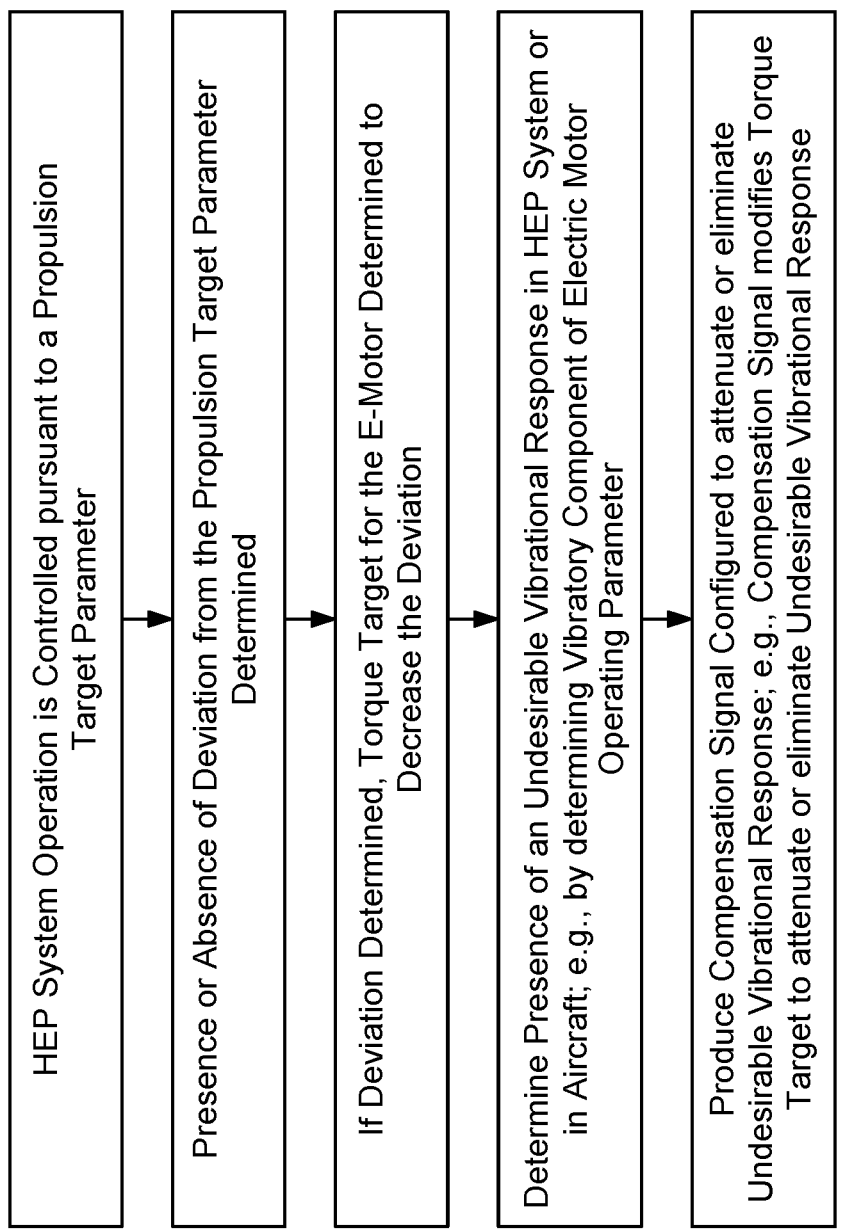
FIG. 4 is a flow chart illustrating an example of a present disclosure method.

The above examples (schematically depicted in the flow chart of FIG. 4) are provided to illustrate how a compensation signal may be used to accomplish the desired damping and are not intended to be limiting. The compensation signal may be used in a variety of different forms using a variety of different control techniques to accomplish the desired damping within the scope of the present disclosure.

A benefit of an RDR controller 68 that is integral with the inverter 36 (or the system controller 28) is that the vibration damping logic can operate at much higher frequencies because it is not limited by the update rate, sampling rate or transmission rate of a controller area network (CANbus), analogue interfaces or Ethernet, or by the processing frequency of any external control box or avionics (e.g. 20 msec update rate). An RDR controller 68 integral with the internal torque control logic of the inverter 36 (much faster than a typical engine control) or within the highspeed signal processing system of the inverter 36 (extremely high speed) would enable the RDR controller 68 to detect and influence even higher frequency vibrations.

As indicated above, however, in some embodiments and RDR controller 68 may be independent of, and in communication with, the inverter 36. For example, an RDR controller 68 may be part of a control box that is independent of the motor inverter 36 (or the system controller 28). In this architecture, the motor inverter 36 may operate in torque control mode, and may receive a torque target from a control box that is responsible for modulating the torque set point to achieve a specific goal such as maintaining a speed (speed control, main rotor speed NR governing). The control box with the RDR controller 68 may monitor sensors that detect vibration or resonances, and may be configured to determine a signal of torque demand bias versus time, which is superposed on the torque setpoint values being determined and transmitted to the motor inverter 36 by the speed control logic, with the effect that at least some of the undesirable vibrations in the system are reduced. The torque signal may therefore be the sum of the average torque target (needed for speed governing function) and the compensation signal provided by the RDR controller 68. The torque signal may be transmitted from the control box to the motor inverter 36 by data bus (such as a CANbus or ethernet), or it can be transmitted by means of an analogue interface such as a varying voltage which is read by the motor inverter 36.

In any of the control systems described above (including the RDR controller 68) may be configured to account for the timing (phase lead/lag) of the compensation signal. For example, the superimposition of the compensation signal may be adjusted (e.g., advanced) for maximum effect, to account for the time delay between the determination of the compensation signal and the resulting change in mechanical torque.

The present disclosure may be used with not only propeller driven aircraft, but also with helicopters (main rotor vibrations caused by lead-lag motions, vibrations of gearbox, tail rotor/main rotor wake interactions, etc.), or with vertical take-off and landing (VTOL) aircraft (e.g. to reduce effect of torsional vibrations in edgewise flight which are caused by air speed affecting advancing and retreating blades differently). The present disclosure may also be applied to a parallel hybrid engine consisting of an electric motor 34 coupled, via a gearbox or directly, to the engine shaft of an intermittent combustion engine, such as a piston engine, diesel engine, rotary engine or rotating detonation engine, in order to reduce at least some of the vibrations that are observed on the common output shaft that is used to power a propulsion device (such as a propeller or helicopter transmission system). Using the present disclosure, the electric motor 34 may observe and be able to counteract or cancel some of the vibrations originating from the engine, the aircraft transmission, and/or the propulsor 32.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of damping vibrations in a hybrid-electric propulsion system configured to drive a propulsor, the hybrid-electric propulsion system including a thermal engine, an electric motor, and an inverter, the method comprising:
   a) controlling the thermal engine and the electric motor to operate at a target propulsion parameter, wherein the inverter is used in the controlling of the electric motor;
   b) determining a presence of a vibrational response within the hybrid-electric propulsion system;
   c) producing a vibration compensation signal configured to damp the vibrational response within the hybrid-electric propulsion system; and
   d) controlling the electric motor to damp the vibrational response using the vibrational compensation signal,
   wherein the determination of the presence of the vibrational response within the hybrid-electric propulsion system is based on variations in a propulsion parameter of the electric motor.

2. The method of claim 1, wherein the propulsion parameter of the electric motor is an amount of torque produced by the electric motor.

3. The method of claim 2, further comprising using the inverter to produce a torque signal representative of the amount of torque produced by the electric motor.

4. The method of claim 3, wherein the torque signal includes a spectrum of frequencies, the spectrum including a base operating component and a vibratory component.

5. The method of claim 4, further comprising separating the vibratory component of the torque signal from the spectrum of frequencies.

6. The method of claim 5, wherein the step of producing the vibration compensation signal configured to damp the vibrational response within the hybrid-electric propulsion system includes producing the vibration compensation signal based on the vibratory component of the torque signal.

7. The method of claim 6, wherein the step of controlling the electric motor to damp the vibrational response using the vibrational compensation signal includes modifying a torque target signal using the vibration compensation signal.

8. The method of claim 7, wherein the modification of the torque target signal using the vibration compensation signal includes superimposing the vibration compensation signal onto the torque target signal.

9. The method of claim 8, wherein steps (b), (c), and (d) are performed in a control loop until the vibrational response is below a predetermined threshold.

10. A method of damping vibrations in a hybrid-electric propulsion system configured to drive a propulsor, the hybrid-electric propulsion system including a thermal engine, an electric motor, and an inverter, the method comprising:
   determining a presence of a vibrational response within the hybrid-electric propulsion system based on variations of a propulsion parameter of the electric motor, the variations determined within the inverter;
   producing a vibration compensation signal configured to damp the vibrational response within the hybrid-electric propulsion system;
   modifying the propulsion parameter with the vibration compensation signal to produce a modified propulsion parameter; and
   using the inverter to control the electric motor to damp the vibrational response using the modified propulsion parameter.

11. A hybrid-electric propulsion system for an aircraft, comprising:
   a propulsor;
   a thermal engine configured to provide motive power to the propulsor;
   an electrical power motive system configured to provide motive power to the propulsor, the electrical power motive system including an electrical distribution bus in communication with an electric motor and an inverter; and
   a system controller in communication with the thermal engine, the electrical power motive system, and a non-transitory memory storing instructions, which instructions when executed cause the system controller to:
   control the thermal engine and the electric motor to operate at a target propulsion parameter, wherein the control of the electric motor includes the system controller cooperating with the inverter to control the thermal engine;
   determine a presence of a vibrational response within the hybrid-electric propulsion system;
   produce a vibration compensation signal configured to damp the vibrational response within the hybrid-electric propulsion system; and
   control the electric motor to damp the vibrational response using the vibrational compensation signal,
   wherein the determination of the presence of the vibrational response within the hybrid-electric propulsion system is based on variations of a propulsion parameter of the electric motor.

12. The hybrid-electric propulsion system of claim 11, wherein the inverter is independent of and in communication with the system controller.

13. The hybrid-electric propulsion system of claim 11, wherein the inverter is at least partially integrated within the system controller.

14. The hybrid-electric propulsion system of claim 11, wherein the propulsion parameter of the electric motor is an amount of torque produced by the electric motor.

15. The hybrid-electric propulsion system of claim 14, wherein the amount of torque produced by the electric motor is determined by the inverter.

16. The hybrid-electric propulsion system of claim 15, wherein the inverter is configured to produce a torque signal representative of the amount of torque produced by the electric motor, and the torque signal includes a spectrum of frequencies.

17. The hybrid-electric propulsion system of claim 16, wherein the torque signal spectrum of frequencies includes a base operating component and a vibratory component.

18. The hybrid-electric propulsion system of claim 17, wherein the vibration compensation signal is configured to damp the vibratory component.

* * * * *